(12) United States Patent
Jerman

(10) Patent No.: US 8,174,751 B2
(45) Date of Patent: May 8, 2012

(54) TWO FREQUENCY RESONANTLY EXCITED MEMS MIRROR FOR DIODE-LASER MARKER

(75) Inventor: John H. Jerman, Palo Alto, CA (US)

(73) Assignee: Coherent, Inc., Santa Clara, CA (US)

( * ) Notice: Subject to any disclaimer, the term of this patent is extended or adjusted under 35 U.S.C. 154(b) by 0 days.

(21) Appl. No.: 13/085,345

(22) Filed: Apr. 12, 2011

(65) Prior Publication Data

US 2011/0188103 A1 Aug. 4, 2011

Related U.S. Application Data

(63) Continuation of application No. 12/240,146, filed on Sep. 29, 2008, now Pat. No. 7,961,370.

(51) Int. Cl.
*G02B 26/08* (2006.01)
(52) U.S. Cl. ..................................... 359/224.1
(58) Field of Classification Search ..... 359/223.1–226.1
See application file for complete search history.

(56) References Cited

U.S. PATENT DOCUMENTS

| | | | |
|---|---|---|---|
| 4,602,858 A | 7/1986 | Serge | |
| 5,257,038 A | 10/1993 | Ferschl et al. | |
| 6,404,313 B2 | 6/2002 | Asada | |
| 6,489,985 B1 | 12/2002 | Brodsky et al. | |
| 6,843,568 B2 | 1/2005 | Schenk et al. | |
| 6,882,462 B2 | 4/2005 | Helsel et al. | |
| 7,407,105 B2 * | 8/2008 | Massieu | 235/462.24 |
| 7,573,625 B2 | 8/2009 | Cannon et al. | |
| 2007/0008401 A1 | 1/2007 | Cannon et al. | |
| 2007/0268950 A1 | 11/2007 | Spinelli et al. | |

OTHER PUBLICATIONS

U.S. Appl. No. 12/233,026, filed Sep. 18, 2008, entitled "Wide Field Diode-Laser Marker with Swinging Projection-Optics," by Sergei V. Govorkov et al, 20 pages in length.
Non Final Office Action received for U.S. Appl. No. 12/240,146, mailed on Oct. 5, 2010, 8 pages.
Notice of Allowance received for U.S. Appl. No. 12/240,146, mailed on Feb. 23, 2011, 5 pages.

* cited by examiner

*Primary Examiner* — Euncha Cherry
(74) *Attorney, Agent, or Firm* — Morrison & Foerster LLP

(57) ABSTRACT

Apparatus for marking a bitmap image on tape includes a scanning mirror which is incorporated in a micro-electro-mechanical system (MEMS). The MEMS is torsionally resonant at two frequencies one being about three time the other. The MEMS is excited to resonance by applying an AC signal to the actuators, causing the mirror to oscillate. The AC signal has components at the two frequencies. The magnitude and phase-relationship of the components can be selected such that the mirror oscillates in an approximation of a triangle-wave.

18 Claims, 8 Drawing Sheets

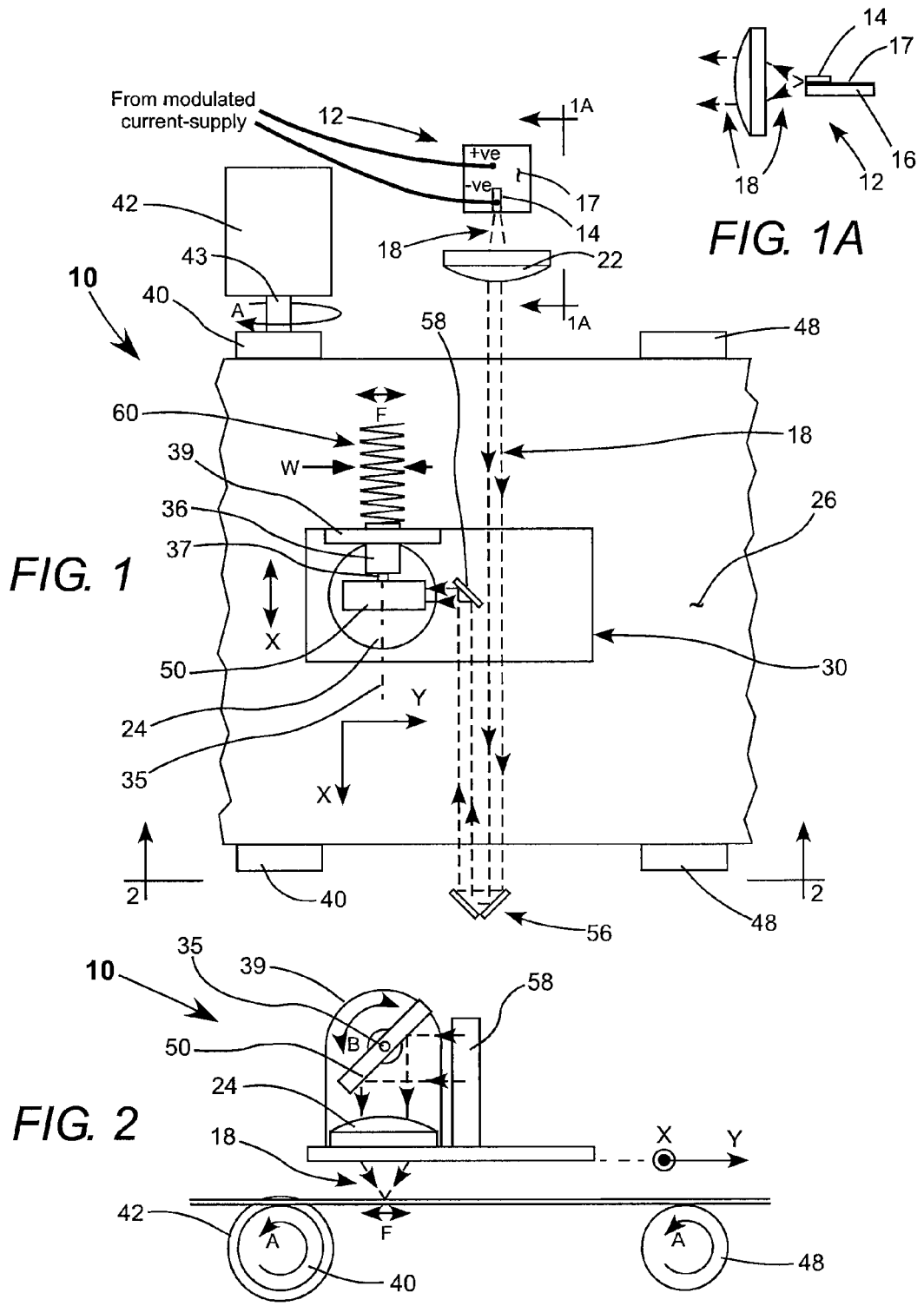

TWO FREQUENCY RESONANTLY EXCITED MEMS MIRROR FOR DIODE-LASER MARKER

PRIORITY

This application is a continuation of U.S. patent application Ser. No. 12/240,146, filed Sep. 29, 2008, the disclosure of which is incorporated herein by reference.

TECHNICAL FIELD OF THE INVENTION

The present invention relates in general MEMS mirrors useful in laser marking systems.

DISCUSSION OF BACKGROUND ART

Laser marking systems are now in common use for marking materials such as metals, glass, wood, and plastic. Lasers used in such marking systems include diode-pumped solid-state lasers, fiber-lasers, and carbon dioxide ($CO_2$) lasers. Typically a beam from whatever laser is used in the system is steered by a two-axis galvanometer and focused by f-theta optics onto a surface of an object being marked.

Special materials have been developed, and are commercially available, for accepting laser radiation to allow high-speed, high-volume, writing of labels with a laser marking system. One such material is "Laser Markable Label Material 7847" available from 3M Corporation of Minneapolis, Minn. This material is a three-layer polymer material having a white base film with a black surface coating to facilitate absorption of laser radiation. The white base film becomes exposed when the black material is ablated away by laser radiation. The base film is backed by an adhesive layer. A paper liner supports the laminate which can be peeled off when the label is to be applied to the product. The white material can be laser-cut to define the bounds of the label and allow such peeling. Other materials include black-anodized metal aluminum foil, organic materials used in electronics packaging and printed circuit boards, and white paper impregnated with a dye having an absorption band in the near infrared region of the electromagnetic spectrum for absorbing NIR laser radiation. These materials are often supplied in tape form, so that large numbers of separate labels can be generated without having to reload material in the label maker, however these materials can also be supplied in individual sheets or the like.

Even the least expensive laser marking system designed for these label materials has a cost about two orders of magnitude greater than a computer peripheral paper-label printer such as an inkjet printer, which puts such a system beyond the means of the majority of smaller industrial or commercial users. This is somewhat unfortunate as such a system does not require periodic replacement of inkjet or toner cartridges and will function until the laser eventually fails which may only be after tens of thousands of hours of actual use. These materials also have significant advantages over inkjet printed labels in terms of ruggedness and durability. Accordingly, there is a need for a significant reduction in the cost of laser marking systems for label printing and the like.

SUMMARY OF THE INVENTION

In one aspect of the present invention a micro-electromechanical system (MEMS) comprises a support-frame having a torsion-beam connected thereto between first and second opposite sides thereof. A mirror and a counter-mass are separately connected to the torsion-beam. Actuators are connected to the torsion-beam for exciting the mirror and counter-mass to torsional resonance. The torsion-beam, the frame, and the counter-mass are configured such that the mirror and counter-mass have first and second torsional-resonance modes at respectively first and second frequencies, with the second frequency being about an integer multiple of the first frequency.

In each of the torsional-resonance modes, the mirror and counter-mass oscillate about a rotation-axis extending through the torsion-beam. The oscillating mirror is useful as a scanning mirror for a laser beam. In a preferred embodiment of the MEMS the actuators are driven by piezoelectric elements by an AC voltage applied thereto. The AC voltage has components at the first frequency and the integer multiple of the first frequency. In one example, the AC voltage has components at 402 Hz and 1206 Hz and the magnitudes of the components are selected such that the mirror oscillates in an approximation to a triangle wave.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

FIG. 1 is a plan view schematically illustrating one preferred embodiment of laser marking apparatus in accordance with the present invention for marking a surface a material in tape form, the apparatus including a linear tape-drive for feeding tape through the apparatus in one direction, a diode-laser for providing laser radiation, and projection-optics for focusing the laser radiation on the tape, with a focusing portion of the projection optics mounted on a carriage translatable in a direction perpendicular to the tape-drive direction and a motor-driven oscillating mirror mounted on the carriage for sweeping the focused beam reciprocally in the tape-drive direction.

FIG. 1A is a partial elevation view seen generally in the direction 1A-1A of FIG. 1 schematically illustrating details of the diode-laser and a collimating lens of the projection optics of FIG. 1

FIG. 2 is an elevation view seen generally in the direction 2-2 of FIG. 1 schematically illustrating details of the oscillating mirror and focusing lens on the carriage of FIG. 1.

DETAILED DESCRIPTION OF THE INVENTION

Figure 3:
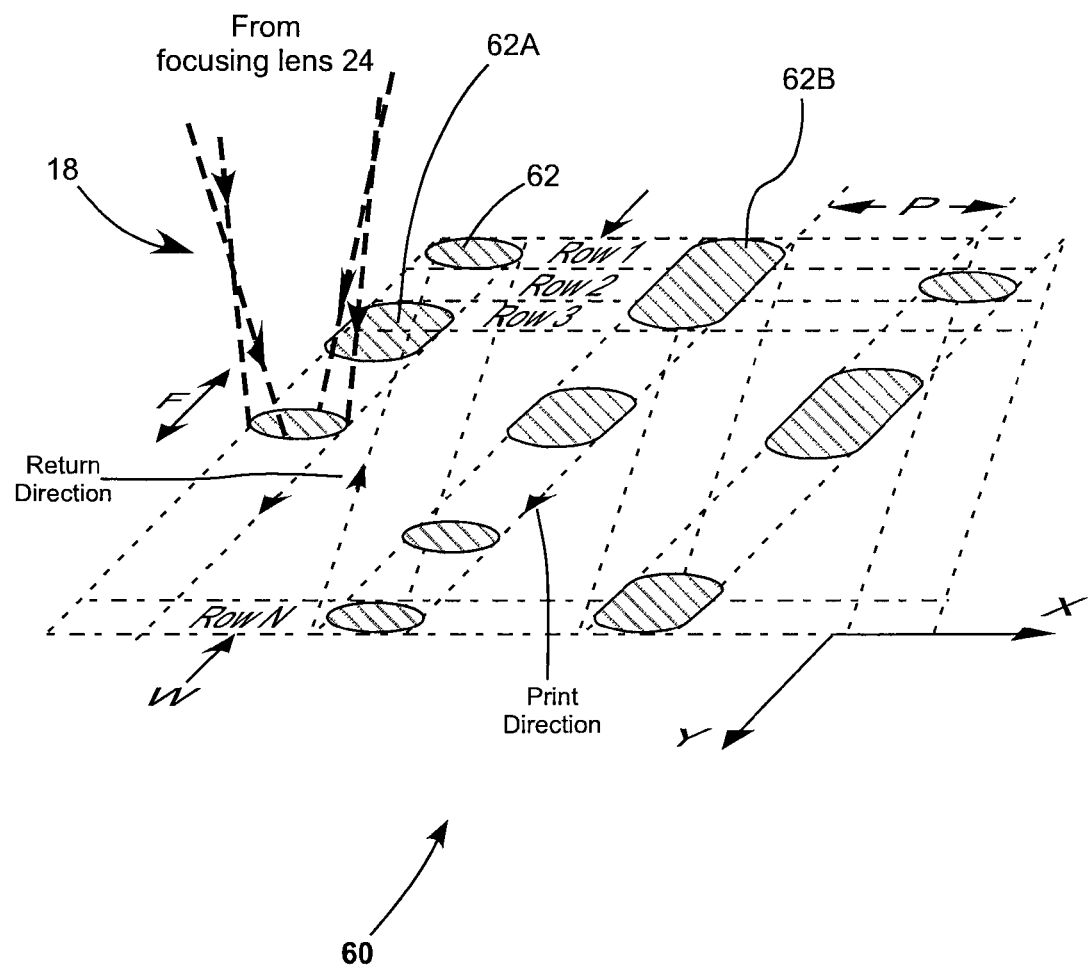
FIG. 3 is a three-dimensional view schematically illustrating details of a method of marking using the reciprocal focused-beam sweep of FIG. 1

Referring now to the drawings, wherein like components are designated by like reference numerals, FIG. 1, FIG. 1A and FIG. 2 schematically illustrates one preferred embodiment 10 of laser marking apparatus in accordance with the present invention. Apparatus 10 includes a diode-laser 12 including an edge-emitting semiconductor heterostructure (emitter) 14 on an insulating sub-mount 16. The sub-mount has a metallization layer 17 thereon to which the emitter is soldered. A heat-sink for cooling the sub-mount is preferably provided but is not shown in the drawings for simplicity of illustration.

Emitter 14 emits a beam 18 diverging in the fast axis of the emitter at an angle of about 30° measured across the FWHM intensity points of the beam (see FIG. 1A). Divergence in the slow-axis (perpendicular to the fast axis) is about 10° (see FIG. 1). These divergences should not be construed as limiting the present invention. Beam 18 from diode-laser 14 is intercepted by a lens 22, which is configured and arranged to collimate beam 18

Tape 26 to be marked is driven by a roller 40, which in turn is driven by a stepper motor 42 via a drive shaft 43 revolving in a direction indicated by arrow A. Tape 26 spans roller 40 and idler roller 48. Preferably, idler-rollers (not shown) are provided for keeping the tape in contact with rollers 40 and 48. A lens 24 for focusing the collimated beam is mounted on a platform or carriage 30. Carriage 30 is translatable back and forth in a direction (X) transverse to the direction (Y) in which the tape is driven by roller 40.

Collimated beam 18 is directed across the width of the tape onto mirrors pair 56. The mirrors of mirror pair 56 are inclined at 45° to the beam direction and the mirrors are inclined at 90° to each other and act as a corner reflector in the plane of the drawing. The mirrors direct beam onto a mirror 58 mounted on carriage 30 at an angle of 45° to the direction of the incident beam. The beam is reflected from mirror 58 onto a one-axis scanning mirror 50. Scanning mirror 50 directs the beam to a focusing lens 24 that is arranged to focus the beam on the surface of tape 26. It should be noted, here that the projection optics arrangement of FIG. 1, wherein beam 18 is directed across tape 26 before being redirected to mirror 58 on carriage 30 is selected such that the change in path length of the beam due to the traversing of carriage 30 is less than one-half of the total path length. This serves to reduce changes in the beam size on lens 24 due to less than perfect collimation of the beam. Depending on collimated beam diameter, it may be found possible to direct beam 18 from the diode-laser directly to mirror 58, without significant loss of performance.

Larger beams are less sensitive to variations in path length. By way of example, for a beam with diameter of 5.0 millimeters (mm) at wavelength around 1.0 micrometers (μm) and a lens focal distance of about 25.0 mm, the focal plane of the lens shifts less than 10.0 μm as the path length varies from 150.0 mm to 350.0 mm. The beam diameter varies by less than a percent. These variations are within usual mechanical tolerances for printer mechanisms.

A drive motor 36 is mounted via a bracket 39 on carriage 30 and is connected to mirror 50 via a drive shaft. Mirror 50 is rotated reciprocally, i.e., oscillated, by motor 36 about an axis 35, parallel to the translation direction of the carriage, i.e., perpendicular to the length direction of the tape, as indicated in FIG. 2 by arrows B. The oscillation of mirror 50 causes the beam focus to sweep reciprocally over the tape as indicated by arrows F. This occurs as carriage 30 traverses perpendicular to the tape direction as indicated by arrow X. This causes the beam focus to follow a wave-like or zigzag path 60, having a width W in the tape-drive direction (Y-direction), across the tape. After a complete sweep across the tape, the carriage is returned to the opposite side of the tape as indicated by arrow X'. Stepper motor 42 drives the tape incrementally for distance W and carriage 30 again traverses the tape in the direction indicated by arrow X.

Means for traversing carriage 30 are not shown in FIGS. 1 and 2 for simplicity of description. Such means are well know to those skilled in the art. By way of example the carriage may be supported on parallel rods or rails and driven by a looped belt or chain drive along the rails. This or any other method may be used without departing from the spirit and scope of the present invention.

Continuing with reference to FIGS. 1 and 2 and with reference in addition to FIG. 3, in one preferred method of operating apparatus 10 diode-laser 14 is driven by current from a modulatable current supply which turns the diode-laser selectively on or off. The modulation is programmed from a computer-generated bit-map image of a graphic design or alphanumeric characters to be printed on the tape.

Referring in particular to FIG. 3, when modulation of the diode-laser turns the diode-laser on, a pixel having a minimum dimension 62 of the bit-map image is printed on the tape. Pixels are printed when mirror 50 sweeps the focused beam in one selected Y-direction (designated the print direction in FIG. 3) with no printing occurring when the focused beam is swept in the opposite direction. Accordingly each traverse of carriage 30 in the X-direction, a plurality (N) of rows of the bitmap is printed.

To be most efficient, each swing of the mirror 50 should cover at least ten rows and more preferably at least forty rows of pixels. Because the carriage is moving in the X direction as the mirror is rotating, the scanning path of the beam spot will not be exactly perpendicular to the Y axis but will extend at as small angle thereto. This slight deviation in the scan direction axis should be taken into consideration when controlling the modulation of the laser.

After the full width of the tape is scanned, the carriage will return in the X'-direction to the opposite side of the tape. Then the tape will be advanced a distance W, and another N rows of the bitmap image are printed in another X-direction traverse of carriage 30.

While it is possible to print all pixels the same size, with adjacent pixels representing a dark area, preferably the laser will be turned on where a dark line is to begin and turned off at the end of that line. By way of example FIG. 3 depicts areas 62A that are about two pixel-dimensions long, and areas 62B that are about three pixel-dimensions long. Further, while printing is depicted as occurring in only one sweep-direction of the focused beam, it is possible to print in both sweep directions. This would improve printing time but would complicate software need for converting a computer generated bit-map to a modulation schedule, and could cause difficulties due to overlapping pixels at the turn around regions of the sweep path.

In a calculated example of apparatus 10 it was assumed that tape 26 was the 7847 tape discussed above, and that emitter 14 emitted between about 5.0 and 10.0 Watts (W) in a beam 18 having a fast-axis divergence (at FWHM) of about 29°. It was determined experimentally that that maximum linear marking speed was about 500 millimeters per second (mm/sec). Collimating lens 22 and focusing lens 24 were assumed to be an aspheric lens-pair available as part number AL3026 available from Thorlabs Inc., of Newton, N.J.

The focused beam, i.e., pixels 62, had dimensions of between about 10 μm and 20 μm by about 90 μm, generally, but not exactly, corresponding to the dimensions of the emitting area (facet) of the diode-laser. Width W was assumed to be sufficient that between about forty and sixty rows of a bit-map image could be printed in a single traverse of carriage 30. The distance P between print-direction sweeps of focused beam 18 (exaggerated in FIG. 3 for convenience of illustration) is preferably about equal to the longest dimension of a pixel 62. This translates to a marking resolution of about 250 dots per inch (dpi). Given these assumptions, it is estimated that about one-minute would be required to print a label about 2.5 inches square. It should be noted here that the short-axis dimension of the focused beam is limited by the quality of imaging optics, as the emitting area of the diode-laser has a fast-axis height of only about 1.0 μm.

Figures 4, 5:
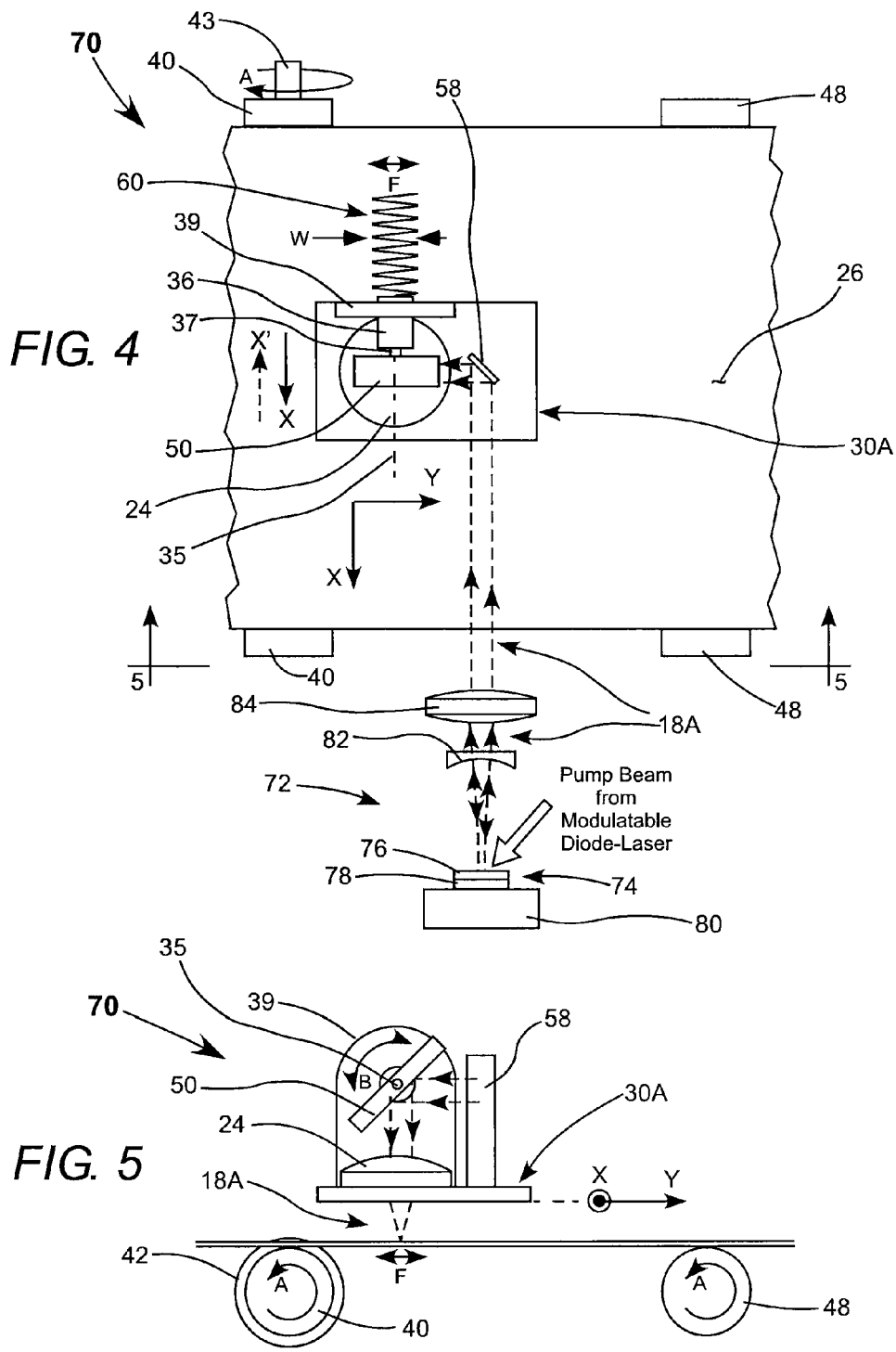
FIG. 4 is a plan view schematically illustrating another preferred embodiment of a laser marking apparatus in accordance with the present invention, similar to the apparatus of FIG. 1 but wherein the diode-laser is replaced by an optically pumped semiconductor laser.
FIG. 5 is an elevation view seen generally in the direction 5-5 of FIG. 4 schematically illustrating details of the oscillating mirror and focusing lens on the carriage of FIG. 4.

FIG. 4 and FIG. 5 schematically illustrate another preferred embodiment 70 of laser marking apparatus in accordance with the present invention. Apparatus 70 is similar to apparatus 10 of FIGS. 1 and 2, with exceptions as follows. In apparatus 70 diode-laser assembly 12 of apparatus 10 is replaced by an optically pumped (diode-laser pumped) external-cavity surface-emitting semiconductor laser 72, hereinafter referred to simply as an OPS-laser. OPS laser 72 includes an OPS-chip 74 having a multilayer semiconductor gain-structure 76 surmounting a mirror structure 78. OPS-chip 74 is supported on a heat-sink 80.

A stable laser-resonator is formed between mirror-structure 78 and a concave out-coupling mirror 82 from which a beam 18A is delivered. Output beam 18A is modulated, for above-described printing, by modulating a diode-laser source (not explicitly shown) that delivers pump radiation to gain-structure 76.

Unlike the poor-quality astigmatic-beam, having different fast-axis and slow-axis divergence, delivered by a diode-laser, beam 18A has the same divergence in each transverse axis and can have a very high beam quality, for example $M^2$ as low as about 1.1. Further detailed description of an OPS-laser is not necessary for understanding principles of the present invention, and, accordingly, such a detailed description is not presented herein. A detailed description of OPS-lasers is provided in U.S. Pat. No. 6,097,742, assigned to the assignee of the present invention, and the complete disclosure of which is hereby incorporated by reference.

The high quality of output beam 18A of OPS-laser 72 allows the beam to be highly collimated by relatively simple collimating optics. In apparatus 70, beam 18A is collimated by a lens 84. One suitable lens from collimating the beam is available as part number LBF254-150 from Thorlabs of Newton, N.J. A highly collimated beam provides that the beam can be delivered directly to mirror 58. The beam can be focused to a circular spot having a diameter of between about 5.0 μm to 10.0 μm or larger.

The choice of beam diameter depends on the medium that is to be printed and the power in the beam. For any given power, a smaller spot allows media with higher melting/ablation intensity threshold, such as metals to be marked. A smaller spot, however, results in a smaller row width and correspondingly smaller spacing between rows. The smaller the line spacing, however, the longer the marking time will be. For low melting point materials such as plastics the focal point can be intentionally positioned above or below the surface to increase the size of the spot on the surface to beyond the focal-spot size.

Resuming here a discussion of printing schemes, in FIG. 3 an "ideal" case of printing path 60 is depicted, wherein the focal-point path in the print-direction (and in the return-direction) is linear, i.e., path 60 can be described as having the form of a "triangle-wave". For the motor-driven scan-mirror of apparatus 10 and apparatus 70, those skilled in the art will recognize that this would require a relatively complicated drive schedule for motor 36. Simpler would be to drive the motor in a standard oscillatory fashion with a result that path 60 would have the form of a sine-wave. This, however, is undesirable as the Y-direction sweep-speed of the focal spot would become increasingly slower from the center-line of the path toward the extremities. Modulation of the laser source would preferably have to be arranged such that printing did not occur at the extremities, but was limited to a portion of the path where sweep velocity was relatively constant. This would limit the portion of the mirror-oscillation cycle during which printing could be effected, thereby increasing printing time. Spacing between print-directions legs in path 60 would also be increased, thereby reducing printing resolution.

Figure 6:
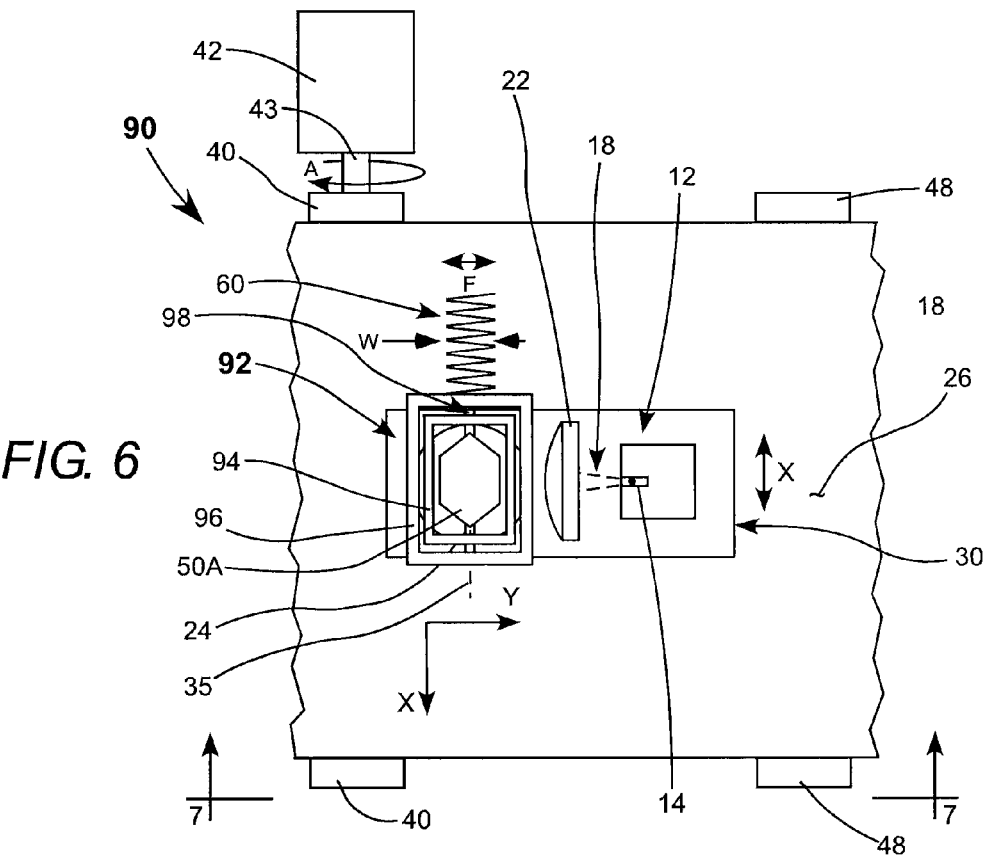
FIG. 6 is a plan view schematically illustrating yet another preferred embodiment of a laser marking apparatus in accordance with the present invention, similar to the apparatus of FIG. 1 but wherein the diode-laser is mounted on the carriage and the scanning mirror is driven by a resonant micro-electromechanical system (MEMS).
Figure 7:
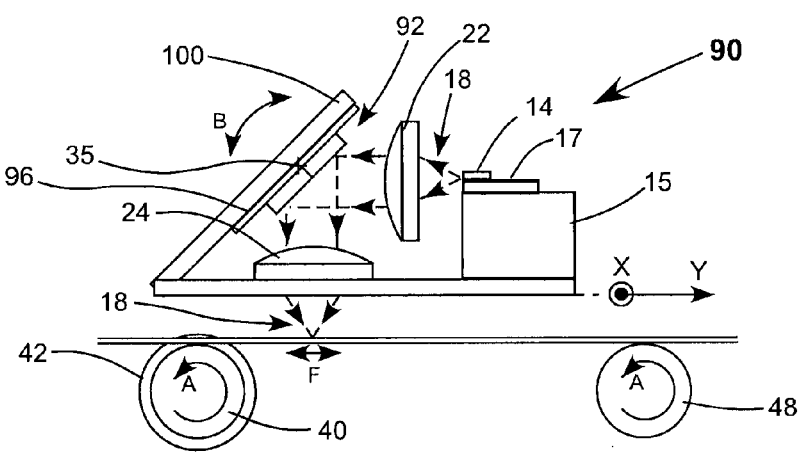
FIG. 7 is an elevation view seen generally in the direction 7-7 of FIG. 6 schematically illustrating details of the MEMS and diode-laser on the carriage of FIG. 6.

FIGS. 6 and 7 schematically illustrate still another embodiment 90 of laser marking apparatus in accordance with the present invention. Apparatus 90 is similar to apparatus 10 of FIG. 1 with exceptions as follows. In apparatus 90, diode-laser assembly 12 is mounted on carriage 30 and traverses with the carriage. Assembly 12 is supported on the carriage via a heat sink 15. Motor-driven scanning mirror 50 of apparatus 10 is replaced in apparatus 90 by a scanning mirror 50A driven by (integral with) micro-electromechanical system (MEMS) 92. MEMS 92 is a device that is designed to be resonant at a selected fundamental frequency and at about the third-harmonic of that fundamental frequency. This as discussed further herein below provides that mirror 55A can be oscillated in a manner that more closely simulates a triangular wave so that the mirror motion can be more linear.

When MEMS 92 is activated, mirror 50A scans about rotation-axis 35 as indicated in FIG. 7 by arrows B. MEMS 92 includes an inner frame 94, or counter-mass, supported in an outer frame 96. Mirror 50A is supported within the inner frame. The inner frame and the mirror separate masses supported on a common torsion beam 98. MEMS 92 is mounted on carriage 30 by a support member 100 (not shown in FIG. 6) to which out frame 96 of the MEMS is bonded. Support-member 100 has a cut-out portion (not visible in FIG. 7)

corresponding to the open portion of outer frame 96. A detailed description of MEMS 92 is set forth below, beginning with reference to FIG. 8.

In order to create a torsionally resonant structure that oscillates approximately as a triangular wave, two different masses, are arranged on a common torsional axis. One of these masses is the mirror structure including mirror 50A and a support platform 102 therefor. The other mass (counter mass) is inner frame 94. The masses are supported on a common torsion beam (spring) 98. In this example, portions 98A of beam 98, connecting inner frame 94 to outer frame 96 have a stiffness different from that of portions 98B of the beam connecting the mirror structure to inner frame 94. Rotation axis 35 extends through the center of the beam.

By selecting an appropriate stiffness for portions 98A and 98B of beam 98, MEMS 92 can be made torsionally resonant simultaneously at two different frequencies with one frequency about three-times higher than the other, i.e., effectively at fundamental and third-harmonic (3H) frequencies. If the MEMS is excited at only the fundamental frequency the mirror structure and counter-mass torsionally (angularly) oscillate in the same direction about axis 35, with the mirror structure having a slightly larger angular excursion at the extremity than that of counter mass. If the MEMS is excited at only the 3H-frequency the mirror structure and counter-mass angularly oscillate about axis 35 in opposite directions.

The basic structure comprises one or more sheet metal parts laminated together. The parts are made preferably by photo-etching or laser-cutting a sheet of metal material such as stainless steel or beryllium copper. Torsional resonances are excited by four piezoelectric transducer (PZT) drive-elements 104 A-D, each thereof bonded to a similarly-sized tongue portion 106 of outer frame 96.

Figure 8:
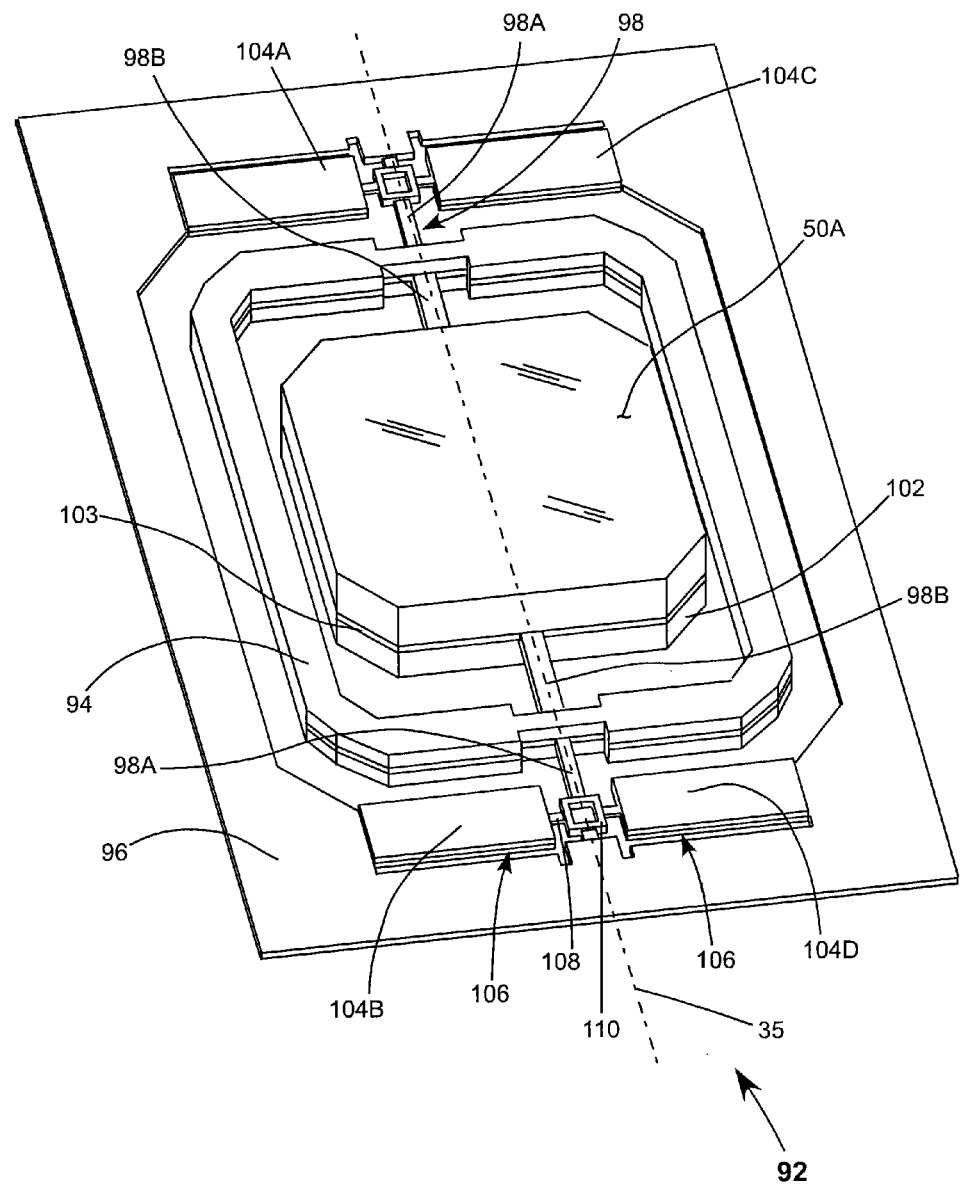
FIG. 8 is a three-dimensional view schematically illustrating, one example in accordance with the present invention of a MEMS scanner driven by piezoelectric actuators and suitable for use in the apparatus of FIGS. 6 and 7.

Mirror 50A is preferably made from silicon coated with a high reflectance coating. Platform 102 supporting the mirror is attached at the center of beam 98 (torsional axis 35), with the additional mass (counter-mass) of frame 94 being attached at an intermediate location along the beam or torsional axis as depicted in FIG. 8. Moments of inertia associated with the mirror structure and the counter-mass are sized along with the lengths, widths, and thickness portions 98A and 98 B of beam 98 to set a desired fundamental torsional resonant frequency of the MEMS and to ensure that the higher order torsional resonant frequency of the MEMS is very close to three-times the fundamental frequency.

It is emphasized here that in a resonant MEMS device, the fundamental and higher order resonant modes (frequencies) are not naturally harmonically-related as would be the case with a long, vibrating wire such a guitar string. The MEMS structure must be specifically designed such that the modes are harmonically related.

For convenience of fabricating MEMS 92, it is preferable to choose the thickness of all portions of beam 98—the thickness of a metal layer under the mirror (between the mirror and platform 10), the thickness of tongues 106 supporting the PZT-elements; and the thickness of frame 96 to be the same. This provides that these parts can easily be etched as a single unit from a single sheet of metal. Note that frame 96 in practice is bonded to a rigid frame such as frame 100 in the apparatus of FIG. 7.

To increase the mass of the mirror structure and the counter-mass structure, additional sheets can be added as depicted in FIG. 8. For making mirror adjustments in resonant frequencies to compensate for dimensional errors within manufacturing tolerances, small amounts of mass can be added to or subtracted from either the mirror structure or the countermass, for example, by adding epoxy or by laser-ablating metal from these structures in order to "fine-tune" the resonant frequencies.

As noted above, design of MEMS 92 is arranged to cause mirror 50A to scan in a "triangle-wave" fashion. Such a triangle wave can be represented as Fourier series of sine-waves of the form:

$$f(x)=\text{Sin}(x)-\text{Sin}(3x)/9+\text{Sin}(5x)/25 \quad (1)$$

which is an infinite series with increasing higher odd-harmonic frequencies having increasingly lower coefficients (each coefficient being the reciprocal of the square of the harmonic). While ten or more terms are required to provide a close approximation to a triangle-wave, it has been found that a reasonable approximation can be achieved with only two (the fundamental and third-harmonic) terms.

Figure 9:
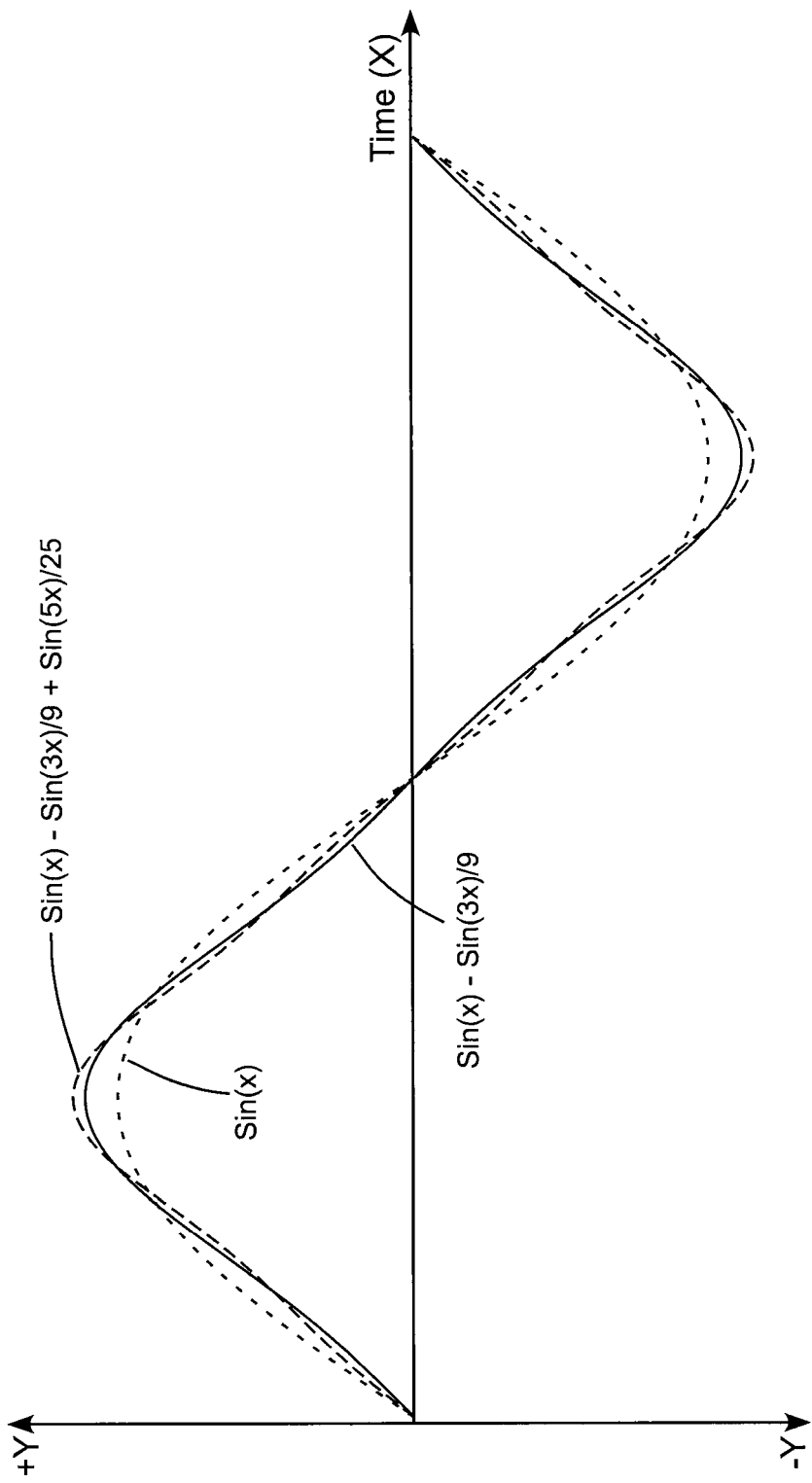
FIG. 9 schematically illustrates an oscillation waveform of the MEMS of FIG. 8 when piezoelectric actuators are excited by an alternating voltage having fundamental and third-harmonic components with other waveforms included for comparison.

FIG. 9 graphically schematically illustrates the computed excursion for one compete cycle in the Y-direction as a function of the excursion in the X-direction (equivalent to traverse time of the carriage in apparatus 90) for the first term (short-dotted curve), the first and second terms (solid curve), and the first second and third terms (long dotted curve) of equation (1). It can be seen that the first two terms provide a curve that is approximately linear over more than about 80% of the cycle, with some little improvement provided by the addition of the third term.

Set forth below is a discussion of results of testing an actual MEMS scanner constructed according to the configuration of FIG. 8. The scanner was made from 17-7 Ph stainless steel. In this MEMS scanner, mirror 50 was made with dimensions 5.1 mm×5.1 mm×1.0 mm. Plate 103 (under the mirror) beam 98 and tongues 106 supporting the PZT elements are 0.1 mm thick and the PZT-elements are 0.125 mm-thick. The PZT elements are each 2.5 mm×1.0 mm. Platform 102 is 0.1 mm-thick. Counter-mass 94 has outer dimensions 9.59 mm×6.68 mm a width of 0.5 mm and a total thickness of 0.2 mm. Beam portions 98A have a width of 0.2 mm and length of 1.19 mm. Beam portions 98B have a width of 0.2 mm and length of 1.75 mm. Computer-predicted resonant frequencies for this scanner, assuming beryllium-copper as the construction material, were 400 Hz and 1200 Hz.

Figure 10:
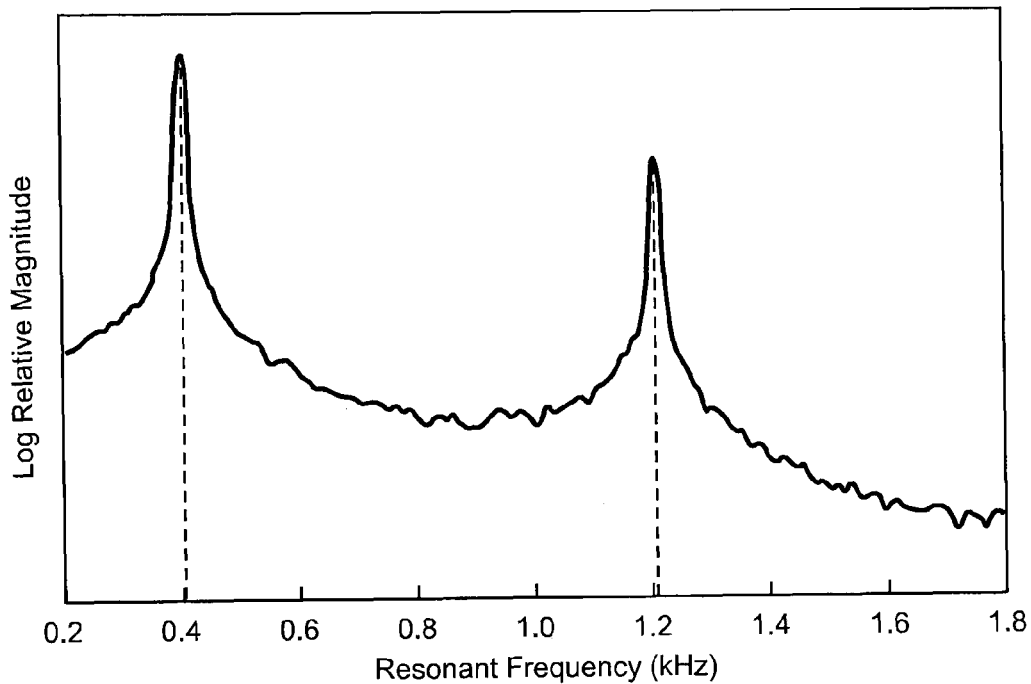
FIG. 10 schematically illustrates the frequency response of an experimental example of the MEMS scanner of FIG. 8 made from stainless steel indicating resonant frequencies at 402 Hz and 1206 Hz.

The measured frequency-response of the experimental stainless-steel scanner is schematically depicted in the graph of FIG. 10. Here peak responses occur at frequencies of 0.402 kHz and 1.206 kHz. A high Q of these resonances is evident from this graph. Depending on the drive level, the Q can be of the order of 500 at the resonant frequencies.

Electrical connections to the experimental MEMS scanner are as follows. The PZT elements are connected as pairs with one pair being PZT 104A and PZT 104B (see FIG. 8) and the other pair being PZT 104C and PZT 104D, i.e., one pair on each side of torsion beam 98. Each pair of PZT elements is driven in parallel. Typically a DC bias of perhaps 30V is applied to all of the PZT elements and AC drive signals at both frequencies of about 20V p-p are added to this DC bias and fed to the PZT structures. Each AC drive signal consists of 3H-component superimposed on a fundamental component with amplitudes of the components and the phase therebetween independently variable.

When voltage is applied to the PZT elements, the poling on the piezoelectric material is such that the elements tend to expand or contract along the long-axis of the element, i.e., perpendicular to beam 98. As they are attached to a metal substrate (tongue 106 in FIG. 8) to form a so-called bimorph arrangement, this causes the bimorph to curl up or down. This action is coupled to the torsional axis by a set of beams (connectors 108 in FIG. 8) so that the curling of the bimorphs results in a relatively-small torque on torsion beam 98. Preferably the AC signals to the opposite pairs of PZT-elements are inverted so that beam 98 is driven in a push-pull fashion from the pairs of PZT-elements. The high mechanical Q of the scanner magnifies the small applied torques from the PZT elements, so that angular deflections of mirror 50A on the order of +/−10 mechanical degrees are easily obtained from the MEMS scanner.

Changes in resonant frequency of this device are dominated by the change in modulus of the metal used for torsion beam 98. For the above described experimental MEMS scanner made in 17-7 Ph stainless-steel, the fundamental frequency is found to change about 0.5% from 20 C to 50 C, and the frequency ratio of the resonances is found to change from 2.9966 to 2.9985 over the same range. As the device temperature changes, it will be necessary to adjust the amplitude and relative phase of the AC drive signals to maintain the desired mechanical motion of the mirror. This will preferably be controlled by optically monitoring the position of the mirror, for example, by using an optical beam reflected from the mirror and a 1D position sensitive detector to sense the position of the reflected beam and thus infer the angular motion of the mirror.

Figure 11:
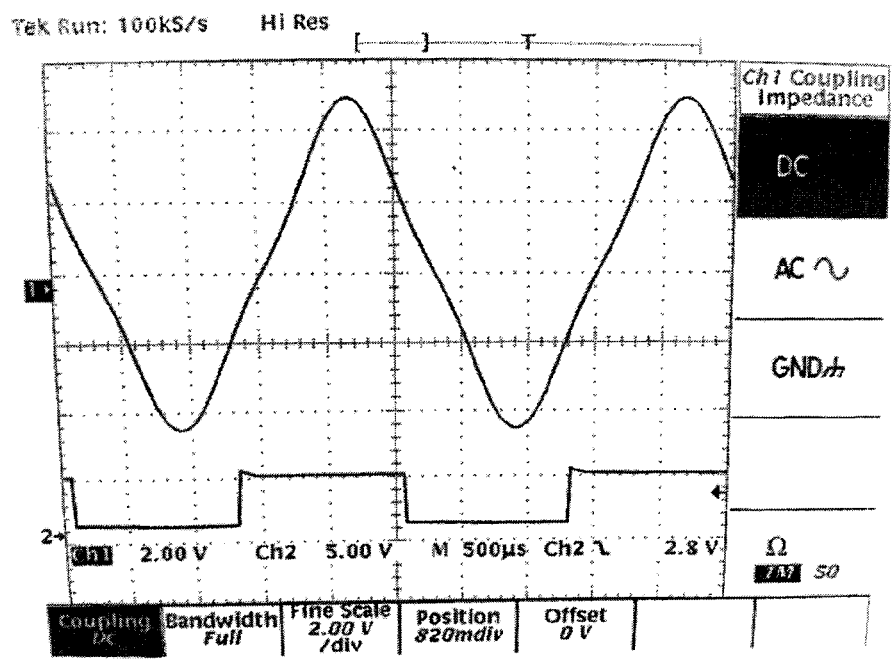
FIG. 11 is a reproduction of an oscilloscope picture depicting a monitored scanning waveform of the experimental scanner of FIG. 10 with the waveform simulating a triangle wave.

Such an arrangement was used in a set of experiments to measure the mirror motion. An example trace of the mirror motion with the superimposed AC drive signals adjusted to produce a triangle wave approximation is depicted in FIG. 11.

It should be noted here that the inventive MEMS scanner is not limited to scanning in approximation of a triangle wave. In the exemplary scanner described above, without any mechanical modification, if the phase of the 3H drive-signal component is adjusted such that the 3H component adds rather than subtracts, scanning may be accomplished in an approximation of a "square-wave". In a scanner designed to have resonances at fundamental, second-harmonic, and third-harmonic frequencies scanning may be accomplished in an approximation of saw-tooth wave fashion using a drive signal of the form:

$$\mathrm{Sin}(x)+\mathrm{Sin}(2x)/2+\mathrm{Sin}(3x)/3 \qquad (2)$$

In all of the laser-marking devices described above, an oscillating mirror mounted on a carriage is used to scan the focus of a modulated laser beam reciprocally over laser-responsive print medium in one direction while the carriage is being traversed over the medium in a direction at 90° to the scan direction. Modulation of the laser beam is arranged such that a plurality of rows of a bit-map image are printed (marked) on the medium in one traverse of the carriage. The medium is then advanced and the carriage traversed to print a next plurality of rows of the image, and so on.

Figure 12:
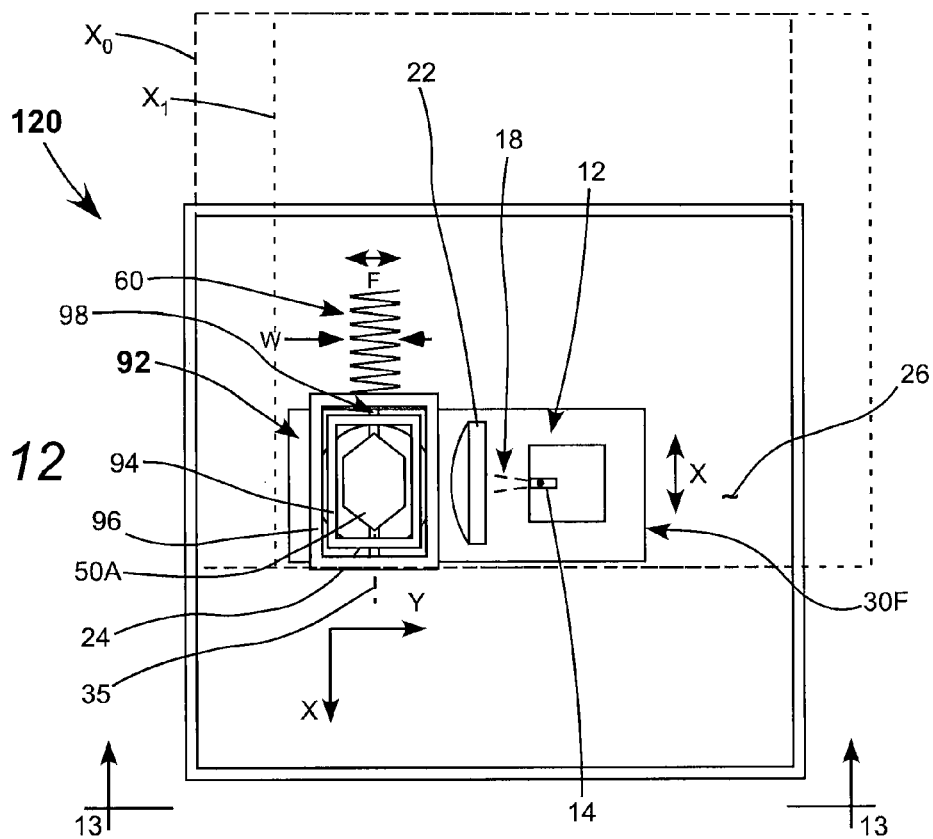
FIG. 12 is a plan view schematically illustrating still another preferred embodiment of a laser marking apparatus in accordance with the present invention, similar to the apparatus of FIGS. 6 and 7 but wherein the carriage is stationary and a sheet of print medium is mounted on a stage translatable in two orthogonal axes to proved relative motion between the medium and the carriage.
Figure 13:
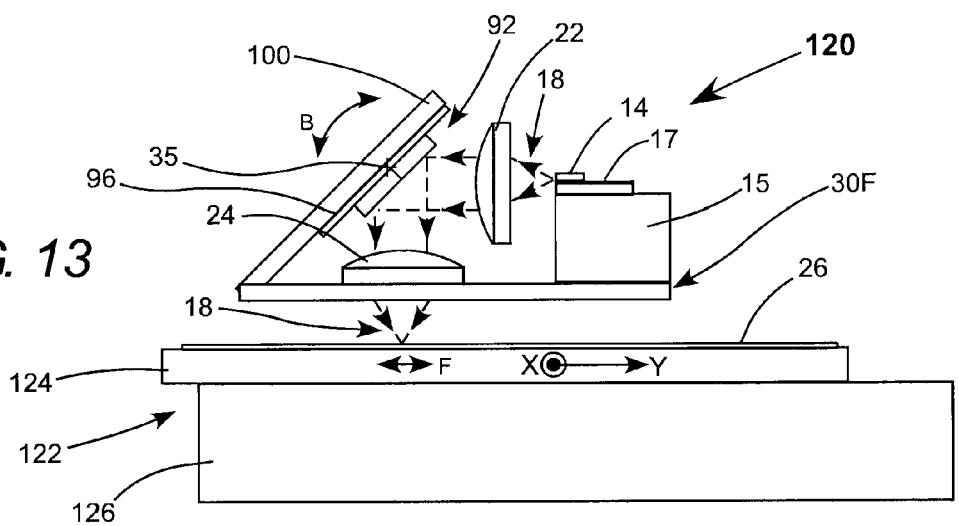
FIG. 13 is an elevation view seen generally in the direction 13-13 of FIG. 12 schematically illustrating details of the translatable stage of FIG. 12.

In apparatus in accordance with the present invention described above relative motion in X- and Y-axes is effected by translating a carriage over the medium in the X-direction to mark one set of rows of an image, then incrementally moving the medium using a roller drive arrangement prior to writing another set of rows. In any of the embodiments it is possible to maintain the carriage in a fixed position while translating the medium with respect to the carriage on an X-Y stage. One such embodiment 120 is depicted in FIG. 12 and FIG. 13.

Apparatus 120 is similar to apparatus 90 of FIGS. 6 and 7 with exceptions as follows. In apparatus 120 carriage 30F is stationary during operation of the apparatus. The roller drive mechanism of apparatus 90 is eliminated and a medium 26 to be marked is in the form of a sheet translatable in both X- and Y-directions by an X-Y stage 122. The medium is mounted on a platform 124 which is translatable on a base 126 of the X-Y stage. In FIG. 12, medium (sheet) 26 is depicted as being part way through one X-direction traverse under carriage 30F, having started from a position indicated by long-dashed line $X_0$. When the X-direction traverse is completed the sheet can be returned to the starting position and then incrementally moved in the Y-direction, by a distance about equal to the focus path-width W, to a new start position indicated by dotted line $X_1$. This translating and incrementing continues until all rows of an image have been marked.

Those skilled in the art will recognize that in any of the embodiments described above means may be provided for monitoring the position of the scanned beam or detecting fiducial marks pre-printed on the medium to aid in accurately "stitching" the pluralities of rows together to form the final image. Such methods may be used with the above-described or any other embodiments without departing from the spirit and scope of the present invention.

In summary, the present invention is described above in terms of a preferred and other embodiments. The invention is not limited, however, to the embodiments described and depicted. Rather, the invention is limited only by the claims appended hereto.

What is claimed is:

1. A micro-electro-mechanical system (MEMS) comprising:
   a support-frame;
   a torsion-beam connected to the support-frame between first and second opposite sides thereof;
   a mirror and a counter-mass separately connected to the torsion-beam;
   at least one actuator mounted on the support frame and operationally connected to the torsion-beam at a point adjacent the first side of the support frame, said actuator for exciting the mirror and counter-mass to torsional resonance; and wherein the torsion-beam, the frame, and the counter-mass are configured such that the mirror and counter-mass have first and second torsional-resonance modes at respectively different first and second frequencies.

2. The MEMS of claim 1, wherein in each of the torsional-resonance modes, the mirror and counter-mass oscillate about a rotation-axis extending through the torsion-beam.

3. The MEMS of claim 2, wherein in the first torsional-resonance mode the mirror and the counter-mass oscillate in the same direction about the rotation-axis.

4. The MEMS of claim 2, wherein in the second torsional-resonance mode the mirror and the counter-mass oscillate in different directions about the rotation-axis.

5. The MEMS of claim 2, wherein the at least one actuator is a piezoelectric actuator.

6. The MEMS of claim 5, wherein the piezoelectric actuator is driven by an AC voltage applied thereto.

7. The MEMS of claim 6, wherein the AC voltage has a form A*Sin(x)−B*Sin(3×) and where A and B are selected such that the mirror oscillates in an approximation of a triangle wave.

8. The MEMS of claim 1, wherein first and second frequency are selected so that the mirror oscillates in an approximation of a square wave.

9. The MEMS of claim 1, wherein the mirror is connected to the torsion-beam about mid-way between connection points of the torsion-beam to the opposite sides of the support-frame, and wherein the counter-mass is in the form of an inner-frame surrounding but separate from the mirror, and connected to the torsion-beam at points thereon between the mirror and the support-frame.

10. The MEMS of claim 9, wherein there are four elongated actuators with two thereof connected via connecting beams to the torsion-beam, on opposite sides thereof, at one end thereof, between the inner-frame and the support-frame, and with another two thereof connected via connecting beams to the torsion-beam, on opposite sides thereof, at an opposite end thereof, between the inner-frame and the support-frame.

11. The MEMS of claim 10, wherein each of the actuators includes a piezoelectric element for driving the actuator.

12. A micro-electro-mechanical system (MEMS) comprising:
- a support-frame;
- a torsion-beam connected to the support-frame between first and second opposite sides thereof;
- a mirror connected to the torsion-beam about mid-way between the first and second sides of the support-frame;
- a counter mass in the form of an inner-frame surrounding but separate from the mirror, and connected to the torsion-beam at points thereon between the mirror and first and second sides of the support-frame;
- first, second, third, and fourth elongated actuators for exciting the mirror and the inner frame to torsional resonance, each of the actuators being connected at one end thereof to the support-frame and at an opposite end thereof, via a connecting beam, to the torsion-beam, with the first and second actuators being connected to the torsion-beam adjacent one end thereof, on opposite sides thereof, between the inner frame and the support-frame, and with the third and fourth actuators being connected to the torsion-beam adjacent one end thereof, on opposite sides thereof, between the inner frame and the support-frame;
- and wherein the torsion-beam, the support-frame, and the inner frame are configured such that the mirror and inner frame have first and second torsional-resonance modes at respectively different first and second frequencies.

13. The MEMS of claim 12, wherein in each of the torsional-resonance modes, the mirror and counter-mass oscillate about a rotation-axis extending through the torsion-beam.

14. The MEMS of claim 13, wherein the actuators are piezoelectric actuators.

15. The MEMS of claim 14, wherein the piezoelectric actuators are driven by an AC voltage applied thereto.

16. The MEMS of claim 15, wherein the AC voltage has a form $A*Sin(x)-B*Sin(3x)$ and where A and B are selected such that the mirror oscillates in an approximation of a triangle wave.

17. The MEMS of claim 12, wherein first and second frequency are selected so that the mirror oscillates in an approximation of a square wave.

18. The MEMS of claim 12, wherein the mirror is made from silicon.

* * * * *